United States Patent [19]
Stendera
[11] Patent Number: 4,473,654
[45] Date of Patent: Sep. 25, 1984

[54] LOW TEMPERATURE BONDING OF REFRACTORY AGGREGATES AND REFRACTORY PRODUCTS OF IMPROVED COLD STRENGTH

[75] Inventor: James W. Stendera, Dover, Pa.
[73] Assignee: The J. E. Baker Company, York, Pa.

[21] Appl. No.: 524,342
[22] Filed: Aug. 18, 1983
[51] Int. Cl.³ ........................ C04B 35/04; C04B 35/06
[52] U.S. Cl. ...................................... 501/108; 501/109; 501/123
[58] Field of Search ......................... 501/108, 109, 123

[56] References Cited

U.S. PATENT DOCUMENTS

| | | | |
|---|---|---|---|
| 234,737 | 11/1880 | Althans et al. | 501/108 |
| 2,210,326 | 4/1937 | Pitt et al. | 501/123 |
| 2,211,789 | 11/1937 | Merrick et al. | 501/133 |
| 2,313,085 | 9/1939 | Neiman et al. | 501/133 |
| 2,313,086 | 9/1939 | Neiman et al. | 501/133 |
| 2,429,872 | 6/1943 | Downs | 501/107 |
| 2,823,134 | 2/1958 | Atlas | 501/108 |
| 2,957,752 | 10/1960 | Gloss | 501/108 |
| 3,108,860 | 10/1963 | Davies et al. | 501/108 |
| 3,194,671 | 7/1965 | Yavorsky et al. | 501/104 |
| 3,201,738 | 8/1965 | Mitoff | 501/108 |
| 3,476,690 | 11/1979 | Carnall, Jr. | 501/108 |
| 3,582,372 | 6/1971 | Criss et al. | 501/111 |
| 3,658,597 | 4/1972 | Gray | 501/102 |
| 3,697,322 | 10/1972 | Lee et al. | 501/108 |
| 3,841,886 | 10/1974 | Burr | 106/110 |
| 4,131,476 | 12/1978 | Melcher et al. | 106/38.35 |
| 4,146,379 | 3/1979 | Copley et al. | 106/39.8 |

FOREIGN PATENT DOCUMENTS

| | | | |
|---|---|---|---|
| 1085841 | 10/1967 | United Kingdom | 501/108 |
| 1225966 | 3/1971 | United Kingdom | 501/108 |
| 487045 | 10/1975 | U.S.S.R. | 501/104 |
| 662531 | 4/1979 | U.S.S.R. | 501/113 |

*Primary Examiner*—James Poer
*Attorney, Agent, or Firm*—Bacon & Thomas

[57] ABSTRACT

Satisfactory bonding of refractory aggregate is obtained by providing the aggregate with at least 5.0% by weight of free CaO of minus 200 mesh (Tyler Standard Sieve) particle size, adding a small amount of a lithium compound to the aggregate and heating to a temperature of about 450° C. The modulus of rupture at room temperature of a brick made from dead burnt dolomite aggregate containing a fine fraction providing the finely divided CaO and the lithium compound additive and fired to 450° C. is well above 400 psi and may be substantially equivalent to that of a brick made of the same aggregate without the lithium compound additive and fired to 1200° C. The invention comprises the method of increasing the low temperature bonding strength of refractory aggregates, the unfired mixtures of the refractory aggregate containing the requisite CaO and the lithium compound with or without temporary liquid or solid binding agents, and the fired products made therefrom.

23 Claims, No Drawings

LOW TEMPERATURE BONDING OF REFRACTORY AGGREGATES AND REFRACTORY PRODUCTS OF IMPROVED COLD STRENGTH

BACKGROUND OF THE INVENTION

1. Field of the Invention

This invention relates to the field of refractories and, in particular, to the low temperature bonding of refractory aggregates such as used in ramming, castable, vibratable, plastic, mortar and gunning mixes and in refractory bricks or other refractory shapes. It also relates to refractory products having improved cold strengths.

2. Description of the Prior Art

Various materials have been used in refractory products to provide a ceramic bond at temperatures which are too low for a direct bond to be formed. Good examples of these materials are sodium silicate, chromic acid, and various phosphorus compounds. Sodium and potassium carbonates have also been used for this purpose (U.S. Patent to Althans et al, U.S. Pat. No. 234,737). In water based systems these materials dissolve in the water, and upon heating or drying precipitate out on the surface of the particles in the refractory aggregate and bond them together. The purpose of these bonding agents is to give the refractory product strength at temperatures too low (e.g. below about 1200° C.) for a direct bond to develop between the grains of the refractory aggregate. In general, these materials must be dissolved to work properly otherwise they are not distributed thoroughly through the aggregate; very poor results are obtained when these materials are used in dry solid form. Since water can be used only with difficulty in refractories containing a substantial portion of unreacted CaO these bonding agents are not useful in products utilizing aggregates having a high content of free CaO, such as dead burnt dolomite.

It has been disclosed by Steetley Refractory Brick Company of England that the hot strength, in the temperature range of 1200° C. to 1500° C., of bricks made from dead burnt magnesia aggregate can be improved by adding an oxide of an alkali metal, such as lithium, sodium or potassium, or a compound of lithium, sodium or potassium, which yields an oxide on heating to temperatures below 1200° C., and a temporary liquid binder to the magnesia aggregate, pressing the mixture into bricks and then firing the bricks to a temperature above 1200° C. to form a ceramic bond (Steetley British Pat. No. 1,085,841). It is well known in the refractory art that magnesia bricks fired at temperature below those at which ceramic bonding takes place possess very little cold strength. The alkali metal compound preferred by Steetley is sodium carbonate. Steetley uses an aqueous solution, such as a solution of sulphite lye, magnesium sulphate or sulphuric acid as a temporary bonding agent. Magnesia contains little or no free CaO which would react with the aqueous binder with disastrous results, unlike dead burnt dolomite in which the free CaO is usually present in excess of 50% of the total weight of the material.

Steetley British Pat. No. 1,225,966 discloses a modification of the process of the earlier British Pat. No. 1,085,841. This patent discloses that a small amount of calcium oxide or calcium oxide precursor such as calcium carbonate or "stabilized dolomite" may be added to the magnesia aggregate along with the lithium, sodium or potassium oxide before addition of the temporary aqueous binder and firing. Stabilized dolomite is a product obtained by reacting dolomite and serpentine to obtain a mixture of di-calcium and tri-calcium silicates, brown millerite, magnesia and magnesia spinels. It is stated that the amount of CaO added by this procedure should be less than 5% where using a calcium oxide additive not containing silica and less than 10% where part of the CaO is tied up in the form of silicates. Calcium carbonate and "stabilized dolomite" are the preferred additives. Bricks made from this mixture and fired to a maximum temperature of 1650° C. show improved hot strength.

It is also disclosed in U.S. Pat. No. 2,957,752 that the density of magnesium oxide made from magnesium chloride may be improved by mixing the magnesium oxide with a lithium compound which is volatilizable under firing conditions, hydrating the mixture and drying and then firing the mixture in the range of 1200° C. to 1500° C.

Other patents have disclosed the use of lithium compounds as dopants for magnesium oxide coatings and crystals, as a catalyst for forming periclase and synthetic diopside and in ceramic mixtures containing MgO, $TiO_2$ and $ZnO_2$. Reference is made to U.S. Pat. Nos. 2,823,134, 3,697,322, 3,476,690 and 4,146,379 and to U.S.S.R. Patent Nos. 487045 and 662531.

BRIEF SUMMARY OF THE INVENTION

It has now been discovered that when a small weight percentage, e.g., from about 0.1 to 5.0%, of a lithium compound is mixed as a finely divided dry solid with a refractory aggregate containing at least 5% of free lime(CaO) in finely divided active form and a temporary non-aqueous binder is added, a bond is formed when the aggregate is heated at low temperatures (e.g., 400° C. to 500° C.) to remove the temporary binder and that the cold strength (MOR at room temperature) of fired products produced from the aggregate containing the lithium compound is considerably improved in comparison to products produced from the same aggregate without the lithium compound addition. Cold MOR strengths of refractory bricks of dead burnt dolomite aggregate fired to 450° C. have been more than doubled by reason of the lithium compound addition. The word firing as used herein, is intended to refer to all instances in which the product has been heated to a temperature sufficient to remove the temporary binder. The cold strengths of bricks fired to higher temperatures are likewise improved. However, it will be recognized that there is a considerable advantage in being able to produce products of adequate strength while utilizing low firing temperatures.

The invention includes unfired refractory compositions of refractory aggregate containing in excess of 5% of free lime (CaO) and from about 0.1 to 5.0% of lithium compound, with or without added temporary non-aqueous binders, suitable for use in such refractory products as ramming, castable, vibratable, plastic, mortar and gunning mixes and bricks or other refractory shapes as well as the finished fired products made from such aggregate and of improved cold strength and the method for making such products. Preferred compositions are those containing at least about 20% of dead burnt dolomite to provide the essential CaO content.

The brick making method comprises the dry mixing of the components of the refractory aggregate of a particle size range conventionally used in the refractory art provided, however, that at least 5% of free lime (CaO) is present in finely divided form, with finely divided dry solid lithium compound until the lithium compound is evenly distributed throughout the aggregate, adding a conventional non-aqueous liquid or solid binder in an amount between 1 to 10% by weight, emplacing, shaping and/or compacting the mixture and firing it at a temperature in the range of from about 400° C. to 1200° C. Improved binding of the aggregate particles is obtained at firing temperatures as low as 400° C. as evidenced by improved MOR at room temperature.

An advantage of using a lithium compound as a bonding agent with a lime containing aggregate, such as dead burnt dolomite, is that it is effective without being dissolved in water or in any other solvent. Thus, it is suitable for use in a product which must be totally dry such as a vibratable mix. It is possible to use this bonding agent in all refractory aggregates which contain uncombined CaO in such amounts that water based binding systems cannot be used.

One product that can be produced may be described as a fired refractory shape consisting essentially of coarse fractions of refractory aggregate bonded with a fine fraction containing at least 5% of free lime (CaO) and from about 0.1 to 5.0% of a lithium compound based on the total weight of the mixture, said shape having been fired at a temperature in the range of about 400° C. to 1200° C. and having a modulus of rupture in excess of 400 psi. In a further preferred embodiment the product consists essentially of coarse and fine fractions of dead burnt dolomite and the lithium additive.

DETAILED DESCRIPTION OF THE INVENTION

The refractory aggregate may be any refractory aggregate known to the art to be suitable for use in ramming, casting, vibratable, plastic, mortar and gunning mixtures or for use in making refractory bricks or other refractory shapes, provided the aggregate contains at least about 5% of free lime (CaO) in finely divided form, either inherently, as in dead burnt dolomite, or by way of CaO additions. Where magnesia (MgO) or other inert refractory aggregate is used, the finely divided free lime (CaO) is added either prior to or mixed with the lithium compound additive.

A preferred refactory aggregate is high grade dead burnt dolomite which typically contains about 56% CaO and 40% MgO with the remainder being impurities such as $Fe_2O_3$, $SiO_2$ and, $Al_2O_3$. When prepared to provide the granulometry conventionally used in the art for products of the type described herein, such aggregate will contain a fine fraction having in excess of 5% CaO, based on the total weight of the aggregate for co-operation with the lithium additive in forming the desired bonding system for the coarser particles of the total aggregate.

It will be understood, however, that the invention is not limited to the use of dolomite aggregate or where dolomite is used, to dolomite of such purity. Other grades of dolomite may be used as well as prepared mixtures containing dead burnt dolomite, dead burnt magnesia, and/or any substantially inert refractory material provided that the mixture contains at least 5% CaO in finely divided form either as prepared from the raw material or as an additive. For example, a suitable aggregate may comprise up to 90% of a coarse fraction consisting essentially of dead burnt dolomite or mixtures thereof with other refractory aggregate in any desired proportions, and a fine fraction consisting essentially of at least about 10% of dead burnt dolomite to provide the necessary finely divided CaO. Fine fractions are conventionally produced by ball milling and are also designated as ball mill fines (BMF). The lithium component may be mixed with the fine fraction prior to its being added to the coarse fraction.

Typical brick making granulometry and brick making conditions suitable for use in the present invention are given in U.S. Pat No. 3,108,860 and elsewhere in the prior art. For brick making the aggregate will generally comprise a coarse fraction with grain sizes varying from about 70 microns up to about ⅜ inch and a fine fraction in which the grain sizes are less than about 70 microns and in which a substantial portion will pass through a 200 mesh Tyler Standard Sieve. However, the invention is not limited to brick making granulometry and conditions. These will vary depending on usage of the composition as in ramming, casting, vibratable, plastic, mortar and gunning mixtures, all of which are well known to those versed in the refractory arts.

It is essential to the present invention that sufficient CaO or CaO-containing fine fraction is present in the total aggregate to provide at least 5% based on the total weight of the aggregate of free CaO of a particle size which will pass through a 200 mesh Tyler Standard Sieve. The finer the free CaO fraction, the better the bonding action that, in co-operation with the lithium compound, is obtained. Thus, if a fine fraction of dead burnt dolomite or free CaO-containing material is added to coarser fractions of dead burnt dolomite or other aggregate, it is important to add enough of the fine fraction to provide the requisite amount of CaO of less than 200 mesh sieve size.

Any of a great number of dry solid lithium compounds or mixtures of lithium compounds may be used for the purposes of this invention, but it will be understood that some compounds will be more suitable than others. It is not necessary that the lithium compound be one which decomposes to lithium oxide at firing temperatures of the refractory products. In fact, lithium halides such as the chloride and fluoride, are quite suitable and lithium fluoride is the compound of choice. Lithium bromide, on the other hand, while believed to be useful, may require a careful choice of temporary binder to prevent reaction with the organic binder compounds during heating and adverse effect upon the product. Other representative examples of lithium compounds which give useful improvements in cold strength of the refractory products are lithium nitrate, and lithium carbonate. Lithium hydroxide, while providing some improvement in product cold strength, is less desirable than the fluoride and chloride because of decomposition with evolution of moisture. Organic as well as inorganic lithium compounds may be used, but the inorganics are preferred since there is less possiblity of interference with the lithium bonding by carbon deposition on the particles of dolomite aggregate. Lithium compounds that decompose with evolution of gases are less desirable than those that sinter or melt at the temperature of firing but may be used provided careful control is exercised during the firing cycle. For example, where lithium carbonate is used, the composition should be heated more slowly. The lithium does not volatilize nor does it appear to enter into the crystal structure of the other metal oxides at the low firing temperatures used in the brick making process of this invention. Its function is that of a bonding agent in co-operation with the finely divided CaO to hold the aggregate particles together. However, it is to be understood that the invention is not to be limited by the theory as to how the improved result is obtained.

It should be noted that other alkali metal compounds, such as sodium fluoride, are less desirable than the lithium compounds in the low temperature bonding system of the present invention. This is unlike the high temperature ceramic bonding system of the Steetley British patents, mentioned above, where sodium and potassium compounds which yield oxides on heating seemed to be equally effective as the decomposable lithium compounds in high temperature bonding of magnesia grain to improve hot strength. Moreover, other fluorides, such as calcium fluoride, have negligible effect on the cold strength of refractory mixes fired at low temperatures.

The amount of lithium compound or mixture of such compounds to be added to the refractory aggregate may be in the range of from about 0.1 to 5.0% by weight based on the total weight of the refractory aggregate. In general, the amount will be less than about 1% by weight with 0.5% usually being adequate. This may be added to and mixed with the fine fraction of the aggregate containing the CaO component prior to mixing with the coarse fraction.

The modulus of rupture strengths at room temperature for refractory bricks pressed out of a dead burnt dolomite aggregate of typical particle size known to the art, including at least 5% of CaO of less than 200 mesh particle size in the fine fraction, and fired to 450° C. are usually less than 400 psi and may be 100 psi or less depending upon the type of temporary binder and degree of pressure employed prior to firing. When 0.5% by weight of a lithium compound, such as lithium fluoride, is added to this aggregate and all conditions are otherwise identical, cold MOR strengths will usually be in excess of 1000 psi. A strong brick is produced at low firing temperature.

The temporary binder, where used, is preferably one of the nonaqueous binders known to the refractory arts. Thus the binder may be of a resinous nature or may be a tar, oil or wax, or a mixture thereof. The nonaqueous binder is usually in liquid form. However, solid particles of thermoplastic resinous binders, such as powdered pitch, are useful in some compositions, particularly in vibratable, and gunning refractory mixes. Where solid resins are used, it is preferred that they soften below about 300° F. The amount of the binder may be in the range of 1 to 10%, usually about 2 to 4% based on the weight of the refractory mixture. Reference is made to U.S. Pat. No. 3,108,880 for a representative example in which paraffin is used as a lubricant and/or temporary binder.

It will be understood that the mixture, containing the refractory aggregate, free CaO and lithium additive may then be emplaced in a kiln or furnace by casting, vibratable or gunning techniques, used as a mortar, pressed into bricks or other shapes and fired.

The invention will be illustrated by the following examples of practice.

EXAMPLE 1

Pressed Bricks

Various representative lithium compounds were added to a dolomite refractory composition for making dolomite refractory bricks. The mixture was pressed into bricks and the bricks were fired to different temperatures over the range 450° C. to 1200° C. and tested for modulus of rupture at room temperature. A control test in which no lithium compound was used and comparative tests against other compositions were also conducted.

Procedure

The basic experimental procedure was as follows:

(1) Sized high purity dead burnt dolomite grain, as is used in standard production, was weighed and batched into a counter flow mixer. The granulometry used was as follows:

| Dead burnt Dolomite | Wt % |
|---|---|
| −4 mesh + 6 mesh | 30 |
| −12 mesh + 18 mesh | 20 |
| −18 mesh + 20 mesh | 15 |
| −30 mesh + 60 mesh | 15 |
| Ball Mill Fines (BMF) (substantially all minus 200 mesh) | 20 |
| Binder | 3 added |

(2) One hundred pound batches were used. All dry ingredients were mixed for 30 seconds. Binder was then added and the batch was mixed an additional two minutes. The batch was then pressed in a hydraulic type press into bricks which were nominally 6″×3″×9″. Pressing pressure was adjusted to yield bricks with a green bulk density of 2.85 g/cc±0.02 g/cc.

(3) The bricks were set in a finger spaced "bung" style setting. Heating was conducted in a gas kiln. The heating schedule used was: 2 hours to 450° C., 2 hours hold at 450° C., 100° C./hr. to the soak temperature, 4 hour soak at temperature, and a 50° C./hr. cool down to room temperature.

(4) After cooling, the bricks were broken on a Tineus Olsen compression tester at a strain rate of 0.4 in/min.

(5) Unless otherwise specified, the amount of the lithium compounds added was adjusted to yield a lithium atom concentration of weight percent in the final batch, not counting the binder.

(6) All batches used the same non-aqueous organic binder (Binder A) except the one noted B which was a blend of fuel oil and paraffin wax.

The results, compared with brick produced the same way without the lithium compound additive and with other fluoride additives and with bricks produced from dead burnt magnesia aggregate with and without lithium additive, are shown in Table I, as follows.

TABLE I

| | Test No. | | | | | | | | | | |
|---|---|---|---|---|---|---|---|---|---|---|---|
| | 1 | 2 | 3 | 4 | 5 | 6 | 7 | 8 | 9 | 10 | 11 |
| | Firing Temp. °C. | | | | | | | | | | |
| | 450° psi | 450° psi | 600° psi | 1000° psi | 1200° psi | 450° psi | 450° psi | 450° psi | 600° psi | 1200° psi | 450° psi |
| Control | 500 | 820 | 544 | 399 | 1749 | 320 | 622 | 487 | | | 480 |
| ½% LiF* | 1297 | | 1698 | 1967 | 2736 | | | | | | |

TABLE I-continued

| | Test No. | | | | | | | | | | |
|---|---|---|---|---|---|---|---|---|---|---|---|
| | 1 | 2 | 3 | 4 | 5 | 6 | 7 | 8 | 9 | 10 | 11 |
| | Firing Temp. °C. | | | | | | | | | | |
| | 450° psi | 450° psi | 600° psi | 1000° psi | 1200° psi | 450° psi | 450° psi | 450° psi | 600° psi | 1200° psi | 450° psi |
| LiF | 1758 | | 1116 | 2419 | 2293 | 1473 | 1033 | 1023 | | | |
| $LiNO_3$ | 1329 | | 1660 | 1293 | 1228 | | 1483 | | | | |
| 1% LiF | 1780 | | 1602 | 3015 | 2954 | | | | | | |
| LiCl | | 1787 | | | | 915 | 923 | | | | |
| $LiCO_3$ | | 1069 | | | | | | | | | 1041 |
| ¼% $LiCO_3$ | | | | | | | | 1594 | | | |
| ½% LiOH | | 746 | | | | 686 | 588 | | | | 559 |
| $CaF_2$ | | 972 | | | | 486 | 745 | 471 | 304 | | |
| NaF | | 849 | | | | 727 | 1320 | | 717 | 1181 | 849 |
| MgO - ½% LiF | | 239 | | | | | | 227 | 64 | 1436 | |
| MgO - no additive | | | | | | | | 135 | 416 | 778 | |

*Binder B (All other compositions in Table used Binder A)

Results and Discussion

It will be noted that with no additive the strength of the dead burnt dolomite bricks fired to 450° C., 600° C. and 1000° C. averaged only about 500 psi, which is not strong enough to be installed in service without some difficulty. Addition of 0.135% lithium as lithium fluoride (½% LiF) raises the cold strength about two to four times for the same heat treatment. Lithium chloride, lithium nitrate and lithium carbonate also considerably increased the cold strength, at the 450° firing temperature, while lithium hydroxide only slightly increased strength. The temporary pressing binder used does not appear critical, provided it is of the non-aqueous type and nonreactive with the lithium compound. The different binders both gave good results with the lithium compounds shown in the Table. Doubling the concentration of lithium to 0.27% (1% LiF) gives only slightly better results than the 0.135% addition. With a 1200° C. heat treatment the bricks without addition are starting to form a direct ceramic bond and are substantially stronger than at the lower treatment temperatures. The bricks with the preferred lithium additions, when fired at 450° C., in some instances possessed approximately the same MOR as the bricks without lithium addition fired at 1200° C. Lithium hydroxide additions increased strength with a 450° C. heat treatment to a lesser degree than the other lithium compounds tested. This is believed to be due to the adverse effect of water on the dolomite given off as the hydroxide decomposed. Lithium bromide, not shown in the Table, could not be tested for the strength increase because when bricks were made with this additive they cracked and bloated during the temporary binder removal phase of curing. Therefore, it is preferred to use lithium compounds which do not decompose on heating to give off $H_2O$ or other decomposition products which would adversely affect the dolomite or other aggregate and which are compatible with the particular temporary binder used.

EXAMPLE 2

Additions to Dolomite Ram

The following experiments show the effect of the addition of lithium compounds to a dolomite ramming mix.

Procedure (1) All dry ingredients were weighed and batched into a mixer as before. High purity dolomite grain was used with the following granulometry.

| Grain Fraction | Wt % |
|---|---|
| +4 mesh | 20 |
| −4 mesh + 6 mesh | 20 |
| −6 mesh + 12 mesh | 10 |
| −18 mesh + 30 mesh | 30 |
| BMF | 30 |
| Viscosity modifier | 1.75 |
| Liquid binder | 4.0 |

The viscosity modifier used was a commercial oleophilic type used in rehology control of paints. The liquid binder used was either #2 fuel oil or the same type of other non-aqueous binder as was used as the press binder with bricks in Example 1. All dry ingredients were mixed dry for 30 seconds. The liquids were then added and mixing was continued for three minutes.

(2) Bricks which were nominally 2"×2¼"×9" were pressed at 5 psi on a hydraulic type press to simulate a ram density.

(3) The bricks were then fired in a gas furnace on the same schedule as the 450° soak used in Example 1.

(4) Fired bricks were then tested on the Tineus Olsen Compression Tester at a strain rate of 0.4 in/min.

Results and Discussion

Results are summarized in Table II below:

TABLE II

| | MOR Ave. of 5 Bricks (psi) | |
|---|---|---|
| Additive | #2 Fuel Oil Binder | Other Binder |
| No additive | 125 | 1177 |
| 0.135 lithium as LiF | 745 | 1858 |

It will be noted that a significant strength increase is observed when the lithium compound is added, irrespective of which binder is used.

EXAMPLE 3

Vibratable Mix

A vibratable mix was prepared from high purity burnt dolomite grain and temporary binder as follows:

| Dolomite grain granulometry | |
|---|---|
| −4 + 6 mesh | 20% |
| −6 + 12 | 20% |
| −12 + 18 | 10% |
| −60 | 25% |
| Ball Mill Fines | 25% |
| Thermoplastic Resin | 3% added |
| Mineral Oil | 4% added |
| Lithium fluoride | 0.75% added |

All additions are percentage by weight based on the weight of the dolomite grain. The mixture was compacted by vibration and then fired at temperatures of 450° C. or more.

The physical properties of the product are shown in Table III below. The physical properties of a product made in the same manner without lithium addition are shown in Table IV for comparison. This product exhibited a typical weak zone at firing temperatures of about 800°-1000° C. which was much less pronounced by the mixtures containing lithium addition.

TABLE III

| | Physical Properties *Stabilized Vibratable Mix | | |
|---|---|---|---|
| Firing Temp. | Green B.D. | Fired B.D. | MOR (psi) |
| 260 C. | 2.70 | 2.56 | 261 |
| 538 C. | 2.66 | 2.52 | 771 |
| 816 C. | 2.65 | 2.45 | 621 |
| 1093 C. | 2.68 | 2.48 | 692 |
| 1371 C. | 2.67 | 2.53 | 935 |

*has LiF added 0.75%

TABLE IV

| | Physical Properties *Standard Vibratable Mix | | |
|---|---|---|---|
| Firing Temp. | Green B.D. | Fired B.D. | MOR (psi) |
| 260 C. | 2..61 | 2.46 | 188 |
| 538 C. | 2.64 | 2.51 | 707 |
| 816 C. | 2.64 | 2.45 | 95 |
| 1093 C. | 2.64 | 2.51 | 353 |
| 1371 C. | 2.65 | 2.60 | 1412 |

*without LiF additive

EXAMPLE 4

A coarse fraction of dead burnt magnesia, as used in conventional brick making, was mixed with dead burnt dolomite ball mill fines in proportions of 80 parts by weight coarse magnesia fraction and 20 parts by weight dolomite fines. The dead burnt dolomite fines provided about 11% by weight of free CaO of minus 200 mesh sieve size. One half percent of LiF, based on the total weight of the refractory aggregate, was mixed with the dolomite fines prior to mixing with the coarse magnesia fraction. When bricks were made from this mixture, as in Example 1, and fired to 450° C., they showed the same order of improvement in cold strength as the bricks in Example 1 as compared to bricks made from the same aggregate without lithium addition.

Although the invention has been described in detail in connection with representative preferred embodiments, it is to be understood that modifications and variations as may appear to those of skill in the art may be resorted to without departing from the spirit and scope of the invention. Such modifications and variations are considered to be within the purview and scope of the invention and the appended claims.

I claim:

1. A method for improving the low temperature bonding of refractory products comprising dry mixing a refractory aggregate comprising at least about 5% free CaO of less than 200 mesh size (Tyler Standard Sieve) with from about 0.1 to 5.0% by weight, based on the weight of the aggregate, of a finely divided solid lithium compound which does not decompose with evolution of water or other detrimental decomposition products upon heating, optionally adding a temporary non-aqueous binder to the mixture, emplacing, shaping and/or compacting the mixture and heating the emplaced, shaped and/or compacted mixture at a temperature in the range of from 400° C. to 1200° C.

2. The method of claim 1 wherein the amount of lithium compound is less than about 1.0% by weight.

3. The method of claim 1 wherein the lithium compound is selected from the group consisting of lithium fluoride, lithium chloride, lithium nitrate and lithium carbonate.

4. The method of claim 1 wherein the lithium compound is lithium fluoride.

5. The method of claim 1 wherein the refractory aggregate is one which is suitable for use in ramming, castable, vibratable, plastic, mortar or gunning mixes, or for use in the production of refractory bricks or other refactory shapes.

6. The method of claim 1 wherein the refractory aggregate is a refractory brick making mixture, a non-aqueous liquid binder is used and the mixture is pressed into shapes before firing.

7. The method of claim 1 wherein refractory aggregate is a vibratable mixture, and the mixture is compacted by vibration.

8. The method of claim 1 wherein the refractory aggregate is an aggregate suitable for gunning mixtures and the mixture is emplaced by gunning techniques prior to heating.

9. The method of claim 1 wherein the refractory aggregate is an aggregate suitable for ramming and the mixture is emplaced and compacted by ramming technique prior to heating.

10. An unfired refractory composition having low temperature bonding properties comprising a refractory aggregate containing at least about 5% by weight free CaO of less than 200 mesh (Tyler Standard sieve) particle size and having from about 0.1 to 5.0% by weight, based on the total weight of the aggregate, of a finely divided solid lithium compound which does not decompose with evolution of water or other detrimental decomposition products upon heating dry mixed therewith.

11. The composition of claim 10 wherein the amount of the lithium compound is less than about 1.0% by weight.

12. The composition of claim 10 wherein the lithium compound is selected from the group consisting of lithium fluoride, lithium chloride, lithium nitrate and lithium carbonate.

13. The composition of claim 10 wherein the lithium compound is lithium fluoride.

14. The composition of claim 10 wherein the refractory aggregate comprises dead burnt dolomite and the CaO is present in a fine fraction of said dolomite.

15. The composition of claim 10 wherein the refractory aggregate consists of dead burnt dolomite and the CaO is present in a fine fraction of said dolomite.

16. The composition of claim 14 wherein part of the refractory aggregate is dead burnt magnesia, the dead burnt magnesia providing a coarse fraction of the aggregate and the dead burnt dolomite providing a fine fraction of the aggregate.

17. The composition of any one of claims 10, 15, or 16 wherein the aggregate is one suitable for refractory brick making.

18. The composition of claim 10 additionally containing from about 1 to 10% by weight of a non-aqueous liquid temporary binder.

19. The composition of claim 10 additionally containing from about 1 to 10% by weight of a thermoplastic solid resinous binder.

20. The composition of claim 10 wherein the aggregate is suitable for refractory ramming, castable, vibratable, plastic, mortar or gunning mixtures.

21. An unfired, emplaced, shaped and/or compacted refractory composition as defined in any one of claims 10 to 16.

22. A fired refractory shape comprising the composition as defined in any one of claims 10 to 16, said shape having been fired at a temperature in the range of from about 400° to 1200° C. and having a modulus of rupture at room temperature in excess of 400 psi.

23. A fired refractory shape as defined in claim 22 wherein the modulus of rupture at room temperature is in excess of 1000 psi.

* * * * *